United States Patent Office 3,320,326
Patented May 16, 1967

3,320,326
PREPARATION OF NON-CONJUGATED
DIOLEFINS
Herman S. Bloch, Skokie, Ill., assignor to Universal Oil Products Company, Des Plaines, Ill., a corporation of Delaware
No Drawing. Filed July 20, 1964, Ser. No. 385,544
5 Claims. (Cl. 260—666)

This invention relates to a process for the production of non-conjugated diolefins. More particularly the invention is concerned with a process for copolymerizing an olefinic hydrocarbon with a diolefinic hydrocarbon in the presence of a certain catalytic composition of matter to prepare non-conjugated diolefinic hydrocarbons.

The need for crude rubber, either natural or synthetic, has increased at a tremendous rate, due to the extended use of said rubber and its position of great importance as a material of modern manufacture, said importance being due to a great extent to the diverse uses to which it may be put. Heretofore, in past years, the amount of rubber which may be obtained from natural sources, such as rubber trees, has been sufficient to satisfy the requirements of modern living. However, these sources of natural rubber may be made unobtainable to many countries which depend upon rubber due to emergencies which may arise. This condition was made apparent during World War II when many sources of natural rubber in the Far East, such as Southeast Asia, were cut off from the Western Hemisphere and certain countries in Europe. When situations such as this arise, substitutes must be found to take the place of the missing natural rubber. In previous years, certain synthetic rubbers such as the types produced by the reaction of butadiene and styrene (GR-S), butadiene and acrylonitrile (Buna-N), butadiene and isobutylene, Thiokol rubber, silicone rubber, neoprene rubber, etc., have been prepared. However, these products have usually been inferior to natural rubber in many of the necessary properties when in the vulcanized elastic state. Therefore, the chemical industry is constantly attempting to overcome the shortcomings of synthetic rubbers by preparing new synthetic rubbers which will possess the desired physical characteristics. A specific example of this constant search for new products which has arisen in the past few years is the polymerization of isoprene in a stereoselective manner to produce a rubbery product similar in many respects to the natural Hevea type rubber. Furthermore, an even more recent discovery has been a rubber known as EP terpolymer rubber which is a three-component compound comprising ethylene, propylene and a third monomer, the latter compound comprising a non-conjugated diolefinic compound.

The uses of rubber in articles of manufacture are of necessity many and varied, being too numerous to list in their entirety. A few representative uses are, for example, the use of raw rubber in the shoe industry for the production of crepe soles for shoes; for erasers, adhesive cements and in the fabrication of gummed fabrics such as, for example, rubber cloaks; for vulcanized rubber products which will include bumpers, buffers, vehicle tires, shockproof and soundproof articles, rubberbands, stoppers, stamps, sponges, elastic thread, belts, packing materials for machine construction, installation, etc.; and hard rubber which may be used as suitable material for combs, tubing, fountain pens, etc. It will be noted from the above list that each type of rubber must possess different physical characteristics. In this respect, the so-called EP terpolymer rubbers which, as hereinbefore set forth, have recently made an appearance in industry, have been found to possess certain physical characteristics which make them extremely useful as gaskets, seals, windshield wipers or as molded products, the finished article possessing a superior life and ability to retain its shape when compared to certain other rubbery compounds. EP terpolymer, when properly vulcanized, built, and reinforced, likewise makes excellent vehicle tires having especially good non-skid properties and ozone resistance. It is believed that the requirements for certain rubbers and particularly EP terpolymer rubbers will be greatly increased due to the wider use of these compounds.

It is therefore an object of this invention to provide a process for the preparation of non-conjugated diolefinic hydrocarbons.

Another object of this invention is to provide a process for preparing non-conjugated diolefinic hydrocarbons which are useful as monomers in the preparation of EP terpolymer rubber.

In a broad aspect, one embodiment of this invention resides in a process for the production of a non-conjugated diolefinic hydrocarbon which comprises copolymerizing an olefinic hydrocarbon with a diolefinic hydrocarbon at polymerization conditions in the presence of a catalyst comprising an alkali metal amide composited on a high surface area, substantially anhydrous solid support which has been promoted with a compound selected from the group consisting of the salts and hydroxides of the alkali metals and alkaline earth metals and thereafter calcined, and recovering the resultant non-conjugated diolefinic hydrocarbon.

A further object of this invention is found in a process for the production of a non-conjugated diolefinic hydrocarbon which comprises copolymerizing an olefinic hydrocarbon with a diolefinic hydrocarbon at a temperature in the range of from about 50° to about 300° C. and at a pressure in the range of from about 5 to about 250 atmospheres in the presence of a catalyst comprising potassium amide composited on substantially anhydrous gamma-alumina having a surface area of from about 50 to about 500 square meters per gram which has been promoted with an alkali metal salt and thereafter calcined, and recovering the resultant non-conjugated diolefinic hydrocarbon.

A specific embodiment of this invention is found in a process for the production of a non-conjugated diolefinic hydrocarbon which comprises copolymerizing propylene with 1,3-butadiene at a temperature in the range of from about 50° to about 300° C. and at a pressure in the range of from about 5 to about 250 atmospheres in the presence of a catalyst comprising potassium amide composited on a substantially anhydrous gamma-alumina support having a surface area of from about 50 to about 500 square meters per gram which has been promoted with lithium nitrate and thereafter calcined, and recovering the resultant non-conjugated heptadiene.

Other objects and embodiments will be found in the following further detailed description of this invention.

As hereinbefore set forth, it has now been discovered that non-conjugated diolefinic compounds which are useful as terpolymers to provide vulcanizable double bonds when included in ethylene-propylene copolymer rubbers are prepared by cross-polymerizing an olefinic hydrocarbon such as ethylene, propylene, 1-butene, etc., with a dienic hydrocarbon, which may be either open chain or cyclic in configuration, in the presence of certain catalytic compositions of matter. These catalytic compositions of matter may be generically referred to as alkaline catalyst, a particularly preferred catalyst comprising an alkali metal amide composited on a promoted high surface area, substantially anhydrous solid support. Examples of mono-olefinic hydrocarbons which may be used include ethylene, propylene, 1-butene, 2-butene, 1-pentene, 2-pentenes, the isomeric hexanes, heptenes, octenes, etc. The prefered mono-olefinic hydrocarbons are those which possess an allylic hydrogen atom such as propylene, 1-butene, etc. inasmuch as greater yields of diolefinic compounds will be obtained when cross-polymerizing these hydrocarbons with a diolefin. Diolefinic hydrocarbons which may be utilized as one of the starting materials in the process of this invention includes 1,3-butadiene, 1,3-pentadiene, 1,4-pentadiene, 1,3-hexadiene, 1,4-hexadiene, 1,5-hexadiene, 2,4-hexadiene, 1,3-heptadiene, 1,4-heptadiene, 1,5-heptadiene, 2,4-heptadiene, 1,3-octadiene, 1,4-octadiene, 1,5-octadiene, 2,4-octadiene, 2,5-octadiene 3,5-octadiene, the alkyl substituted butadienes, pentadienes, hexadienes, heptadienes, octadienes, etc., 1,3-cyclopentadiene, and its dimer, dicyclopentadiene, 1,3-cyclohexadiene, 1,4-cyclohexadiene, 1,3-cycloheptadiene, 1,4-cycloheptadiene, 5-methyl-1,3-cyclopentadiene, 5,5-dimethyl-1,3-cyclopentadiene, 5-methyl-1,3-cyclohexadiene, 5,6-dimethyl-1,3-cyclohexadiene, the vinylcyclohexanes, etc. It is to be understood that the aforementioned mono-olefinic and diolefinic hydrocarbons are only representatives of the class of compounds which may be used and that the present invention is not necessarily limited thereto.

The cross- or copolymerization of the mono-olefin with a diolefinic hydrocarbon to form the desired non-conjugated diolefins is effected in the presence of an alkali metal amide disposed on a promoted metal oxide support. The term "promoted," as used hereinbefore and hereinafter in the specification and also in the appended claims, will refer to a pretreatment of the metal oxide support with a salt or hydroxide of a metal selected from the group including alkali metals and alkaline earth metals such as lithium, sodium, potassium, rubidium, cesium, magnesium, calcium, strontium and barium. Of the alkali metal amides which are composited or disposed on the promoted metal oxide support, potassium and sodium are preferred inasmuch as said metals exhibit substantially more activity than do other metals of the alkinous metal group (i.e., the group comprising alkali metals and alkaline earth metals) and potassium is especially preferred for the same aforesaid reason. In addition to their high activity, these two metals are preferred from an economic standpoint inasmuch as said metals are relatively more plentiful and correspondingly less expensive to use.

In preparing such catalysts, the alkali metal amides are disposed on a support in a quantity ranging from about 2 to about 20% or more by weight based on the support. The preferred supports which are utilized in the process of the present invention are those which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form.

In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metal amides in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal amide dispersions on sand or on other low surface area silica are not satisfactory catalysts in this process. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from 50 to about 200 meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the surface nate, potassium aluminate, etc., from which a substantial tioned types of support another type is that which is prepared from an alkali aluminate such as sodium aluminate, potassium aluminate, etc., from which a substanital majority of the alkali metal has been removed leaving only the alumina with a relatively minor amount of the alkali metal present.

The desired support, preferably, although not necessarily, gamma-, eta- or theta-alumina is pretreated with a promoter in any manner. One method of impregnating the solid support is to treat said support with an alkali metal hydroxide such as lithium hydroxide, potassium hydroxide, sodium hydroxide, etc., and thereafter calcine at a temperature, usually in the range of from about 500° to about 700° C. whereby said hydroxide is thoroughly dehydrated.

The catalytic composition of matter which is used in the process of the present invention is then prepared by dissolving an alkali metal such as potassium in liquid ammonia and impregnating the promoted alumina with an ammonia solution of potassium amide, the potassium amide having been formed when the potassium reacted with the ammonia. Following this impregnation by the alkali metal amide in the ammonia the excess ammonia is driven off and the catalyst is then ready for use in the desired conversion reaction. Examples of alkali metal amides which may be utilized include potassium amide, sodamide, lithium amide, rubidium amide, cesium amide, the preferred amides comprising sodamide and potassium amide due to the relatively large amount of these metals available and the correspondingly lower cost of the same.

The process of this invention may be effected in any suitable manner and may comprise either a batch or continuous type operation. When a batch type operation is used, a quantity of the diolefinic hydrocarbon which is to undergo cross-polymerization with the mono-olefin is placed in an apropriate apparatus such as a condensation flask, or if higher pressures and temperatures are to be used, in a rotating autoclave. The particular apparatus which has been selected will contain the particular catalytic composition of matter of the type hereinbefore set forth comprising an alkali metal amide disposed on a promoted metal oxide support which is substantially anhydrous in nature and possesses a high surface area. If so desired, a substantially inert organic diluent may also be added, said diluent or solvent including aromatic hydrocarbons which contain no alkyl substituents with an alpha-hydrogen, such as benzene, naphthalene, t-butylbenzene, etc., or paraffinic and cycloparaffinic hydrocarbons such as n-pentane, n-hexane, n-heptane, cyclopentane, cyclohexane, etc. The apparatus is then sealed and the olefinic hydrocarbon is charged thereto until the desired operating pressure has been reached. Following this, the apparatus and contents thereof are then heated to the desired reaction temperature and maintained thereat for a predetermined residence time which may be from about 0.5 to about 10 hours or more. At the end of the desired reaction period, the apparatus and contents thereof are allowed to cool to room temperature, the excess pressure is vented, the apparatus is opened and the reaction product which comprises a non-conjugated diolefinic hydrocarbon is separated from the catalyst, purified and recovered by conventional means such as fractional distillation, crystallization, etc.

It is also contemplated within the scope of this invention that the process described herein may also be effected in a continuous type of operation, the catalyst which comprises an alkali metal amide disposed on a promoted metal oxide support being particularly suitable for use in a fixed bed type of operation. When this method is used, the catalyst is disposed as a fixed bed in a reaction zone which is maintained at the proper operating conditions of temperature and pressure. The reactants comprising the diolefinic hydrocarbon of the type hereinbefore set forth and the olefinic hydrocarbons such as ethylene, propylene, etc., are continuously charged thereto through separate streams. Alternatively, the reactants may be admixed prior to entry into said reaction zone and charged thereto in a single stream. In addition, if an organic diluent or solvent which is substantially inert in nature is to be used, it may also be charged to the reactor through a separate line or admixed with one or both of the starting materials prior to entry into said reactor. In carrying out the process of this invention in a continuous manner, liquid hourly space velocities (the volume of liquid hydrocarbon charged to the reactor per volume of catalyst per hour) may be varied within a relatively wide range of from about 0.1 to about 20 or more, the preferred range being from about 0.5 to about 10. The starting materials flow over the catalyst bed in either an upward or downward flow and after remaining in the reaction zone for a predetermined residence time, are continuously withdrawn, the desired reaction product is separated from the reactor effluent and purified by conventional means of the type hereinbefore set forth while the remaining effluent may be recharged, at least in part, to the reaction zone as a portion of the feed material.

Other continuous types of operations which are contemplated within the scope of this invention for use therein include the compact moving bed type of operation in which the bed of catalyst and the reactants pass either concurrently or cocurrently to each other in the reaction zone, and the slurry type of operation in which the catalyst is carried into the reaction zone as a slurry in the liquid diolefinic hydrocarbon.

The cross- or copolymerization of the olefinic hydrocarbon such as ethylene, propylene, etc. and the diolfinic hydrocarbon is preferably effected at an elevated temperature and pressure, the temperature being in the range of from about 50° to about 300° C. or more. In addition, the pressure at which the process of this invention is operated will be dependent to a large extent upon the particular organic compounds which are undergoing cross-polymerization, said pressures being sufficient to maintain a major portion of the hydrocarbons in the liquid phase. Generally speaking, this pressure will range from about 5 to about 250 atmospheres or more.

Representative examples of compounds which may be prepared according to the process of this invention which are non-conjugated in nature include 1,4-hexadiene, 1,4-heptadiene, 1,5-octadiene, 1,5-heptadiene, 2,5-heptadiene, 3-methyl-1,4-hexadiene, 1-allyl-3-cyclopentene, 1-vinyl-3-cyclopentene, 1-vinyl-3-cyclohexene, 1-allyl-3-cyclohexene, etc. It is to be understood that these compounds are only representative of the class of non-conjugated dienic hydrocarbons, both open chain and cyclic in nature, which may be prepared and that the present invention is not necessarily limited thereto.

The following examples are given to illustrate the process of the present invention which, however, are not intended to limit the generally broad scope of the present invention in strict accordance therewith.

EXAMPLE I

A conversion catalyst was prepared by condensing 300 cc. of ammonia gas in a 500 ml. flask along with 0.2 g. of calcined ferric oxide as a promoter. The flask was maintained at the reflux temperature of ammonia and potassium was slowly added to the flask in small increments. When the reaction of the potassium with the liquid ammonia to form potassium amide was completed, as evidenced by the disappearance of the blue color of the solution, 50 cc. of alumina which had previously been treated with lithium hydroxide was added. The alumina was prepared by calcining approximately 500 cc. of halide-free alumina spheres for a period of four hours at 550° C. Following this the spheres were stored in a desiccator; then fifty cc. of the spheres were impregnated with lithium hydroxide solution equal to 0.5 weight percent of the alumina, and then calcined for an additional two hours at 550° C. After the lithiated or promoted alumina was impregnated with potassium amide, the excess ammonia was removed by evaporating the mixture while continuously stirring the same. Following the evaporation of the ammonia gas the catalyst was flushed with dried nitrogen and transferred to the reactor.

The reactor comprised a stainless steel tube provided with heating means. After 100 cc. of the catalyst prepared in the above paragraph was loaded, the reactor was flushed and the reactants were charged thereto. The reactants comprising ethylene and 1,3-butadiene were charged to the reactor at a rate of 25 grams of ethylene per hour and 16 grams of 1,3-butadiene per hour. In addition, the diluent comprising n-heptane was also charged to the reactor at a rate of 200 grams per hour. The reactor was maintained at a pressure of 1200 pounds per square inch and at a temperature in the range of from about 125° to about 145° C. The liquid product was recovered at a rate of about 4 grams per hour and subjected to fractional distillation under reduced pressure. The products were analyzed by means of a mass spectrometer, bromine number and a gas-liquid chromatograph. The major copolymer constituents of the product comprised $C_{10}$ compounds which were mostly mono-olefinic in nature and $C_8$ copolymers of which 50% were dienic in nature; some hexadienes were also formed.

EXAMPLE II

In this example, 50 cc. of precalcined, fluid-free alumina spheres were again calcined at a temperature of about 550° C. for a period of 4 to 5 hours. Following this, the gamma-alumina was treated with sufficient lithium nitrate solution to give 0.5 weight percent of lithium based on the gamma-alumina. The promoted alumina was dried and calcined for a period of 5 to 6 hours at 550° C., during which time an evolution of nitrogen oxides occurred, thereby indicating that at least a portion of the lithium was present on the alumina base in the form of lithium oxide.

A potassium amide solution was prepared by condensing 300 cc. of ammonia gas in a flask and adding the potassium thereto in small increments while the flask was maintained at the reflux temperature of the ammonia. After all of the potassium had dissolved, an amount of the thus formed potassium amide in the liquid ammonia solution sufficient to prepare a finished catalyst containing 20 weight percent of potassium amide based on the promoted alumina support was poured over the lithium nitrate treated gamma-alumina base. The flask was allowed to rotate until all of the ammonia evaporated.

Upon completion of the catalyst preparation, the flask is flushed with dried nitrogen and the catalyst is transferred to a reactor similar in nature to that hereinbefore described in Example I under a dried nitrogen flow. The reactor, which contains 100 cc. of the catalyst, is flushed with n-heptane to insure that all of the nitrogen has been flushed out. Following this, the reactants are charged to the reactor at a rate of 42 grams of propylene per hour and 14 grams of 1,3-butadiene per hour, said reactants being dissolved in 100 grams per hour of an n-heptane diluent. The reactor is maintained at a pressure of about 1000 pounds per square inch and a temperature of about 130° C. The product which is recovered at a rate of about 6 grams per hour is subjected to fractional distillation under reduced pressure. The fractionated product is analyzed by means of a mass spectrometer and a gas-liquid chromatograph, as well as having a bromine number determination performed thereon. The major copolymer constituent comprises non-conjuated heptadienes containing a major portion of the 1,5- and 2,5-isomers.

EXAMPLE III

In this example a catalyst is prepared similar in nature to that hereinbefore set forth in Example II above. This catalyst is loaded into a stainless steel reactor in an amount of 100 cc., said loading being done under a dried nitrogen flow. Upon completion of the loading of the catalyst, the reactor is flushed with n-heptane to insure the complete removal of nitrogen which may still be present. Following this the reactants are charged to the reactor in an amount of 42 grams per hour of propylene and 17 grams per hour of 1,4-pentadiene, along with 100 grams per hour of an n-heptane diluent. The reactor is maintained at a pressure of about 1800 pounds per square inch and a temperature of about 130° C. The reaction products are withdrawn and subjected to fractional distillation under reduced pressure. Following this the fractionated products are analyzed by means of a mass spectrometer and a gas-liquid chromatograph. Bromine numbers are also determined to find the amount of unsaturation present. The major copolymer constituent comprises a mixture of $C_8$ dienes, a major portion of which comprises 4-methyl-heptadienes, said heptadienes having unsaturation in both the 1,5- and 2,5-positions.

EXAMPLE IV

A catalyst comprising potassium amide disposed on a gamma-alumina support which has been promoted by the addition of lithium nitrate in an amount sufficient so that the promoted alumina will contain about 0.5 weight percent of lithium, based on the gamma-alumina, is charged to a reactor in an amount of 100 cc. The reactor is flushed with n-heptane and the reactants comprising 42 grams per hour of propylene and 17 grams per hour of cyclopentadiene are then charged to the reactor along with 100 grams per hour of n-heptane. The reactor, comprising a stainless steel tube, is maintained at a temperature of about 130° C. and a pressure of about 1800 pounds per square inch. The product which is recovered at a rate of about 6.2 grams per hour is subjected to fractional distillation and the fractionated products thereafter analyzed to determine the nature thereof, said analysis being done by means of bromine number determinations, mass spectrometer analysis and gas-liquid chromatograph analysis. The major copolymer constituent of the reaction product will comprise a mixture of allyl cyclopentenes and propenyl cyclopentenes.

EXAMPLE V

In this example a catalyst prepared in the manner similar to that hereinbefore set forth in Example II above is loaded into a stainless steel reactor under dried nitrogen flow. The reactor is then flushed with n-heptane and the reactants charged thereto. These reactants are charged at a rate of 56 grams per hour of 1-butene and 14 grams per hour of 1,3-butadiene along with 100 grams per hour of n-heptane. As is the case in the above examples, the reactor is maintained at a temperature of about 130° C. and a pressure of about 1200 pounds per square inch. The liquid product is recovered at a rate of about 7 grams per hour and subjected to fractional distillation. The fractionated product is analyzed by means of bromine number determinations, mass spectrometer and gas-liquid chromatograph. It is found that the major copolymer constituent of the product comprises a mixture of $C_8$ dienes, a major portion of which comprises 3-methyl-heptadiene isomers containing unsaturated bonds in the 1,5- and 2,5-positions on the chain.

I claim as my invention:

1. A process for the production of a non-conjugated diolefinic hydrocarbon which comprises copolymerzing propylene with a diolefinic hydrocarbon at a temperature in the range of from about 50° to about 300° C. and at a pressure in the range of from about 5 to about 250 atmospheres in the presence of a catalyst comprising an alkali metal amide composited on a high surface area, substantially anhydrous solid support which has been promoted with a compound selected from the group consisting of the salts and hydroxides of the alkali metals and alkaline earth metals and thereafter calcined, and recovering the resultant non-conjugated diolefinic hydrocarbon.

2. A process for the production of a non-conjungated diolefinic hydrocarbon which comprises copolymerizing propylene with a diolefinic hydrocarbon at a temperature in the range of from about 50° to about 300° C. and at a pressure in the range of from about 5 to about 250 atmospheres in the presence of a catalyst comprising an alkali metal amide composited on a high surface area, substantially anhydrous alumina which has been promoted with a compound selected from the group consisting of the salts and hydroxides of the alkali metals and alkaline earth metals and thereafter calcined, and recovering the resultant non-conjugated diolefinic hydrocarbon.

3. A process for the production of a non-conjugated diolefinic hydrocarbon which comprises copolymerizing propylene with a diolefinic hydrocarbon at a temperature in the range of from about 50° to about 300° C. and at a pressure in the range of from about 5 to about 250 atmospheres in the presence of a catalyst comprising potassium amide composited on substantially anhydrous gamma-alumina having a surface area of from about 50 to about 500 square meters per gram which has been promoted with lithium nitrate and thereafted calcined, and recovering the resultant non-conjugated diolefinic hydrocarbon.

4. A process for the production of a non-conjugated diolefinic hydrocarbon which comprises copolymerizing propylene with 1,3-butadiene at a temperature in the range of from about 50° to about 300° C. and at a pressure in the range of from about 5 to about 250 atmospheres in the presence of a catalyst comprising potassium amide composited on a substantially anhydrous gamma-alumina support having a surface area of from about 50 to about 500 square meters per gram which has been promoted with lithium nitrate and thereafter calcined, and recovering the resultant non-conjugated heptadiene.

5. A process for the production of a non-conjugated diolefinic hydrocarbon which comprises copolymerizing propylene with 1,3-cyclopentadiene at a temperature in the range of from about 50° to about 300° C. and at a pressure in the range of from about 5 to about 250 atmospheres in the presence of a catalyst comprising potassium amide composited on a substantially anhydrous gamma-alumina support having a surface area of from about 50 to about 500 square meters per gram which has been promoted with lithium nitrate and thereafter calcined, and recovering the resultant non-conjugated allyl cyclopentene.

References Cited by the Examiner

UNITED STATES PATENTS

| | | | |
|---|---|---|---|
| 2,349,232 | 5/1944 | Joshel | 260—666 |
| 2,599,249 | 6/1952 | Friedman | 260—680 |
| 2,769,850 | 11/1956 | Closson et al. | 260—668 |
| 3,080,432 | 3/1963 | Voltz et al. | 260—666 |
| 3,128,318 | 4/1964 | Meisinger et al. | 260—683.15 |
| 3,163,612 | 12/1964 | Meisinger et al. | 260—683.15 X |

PAUL M. COUGHLAN, Jr., *Primary Examiner.*